United States Patent [19]

Grossmann

[11] 4,099,064
[45] Jul. 4, 1978

[54] DEVICE FOR PRETESTING ORIGINALS TO BE COPIED FOR THEIR COPYABILITY

[75] Inventor: Walter Grossmann, Russikon, Switzerland

[73] Assignee: Gretag Aktiengesellschaft, Regensdorf, Switzerland

[21] Appl. No.: 744,342

[22] Filed: Nov. 23, 1976

[30] Foreign Application Priority Data

Nov. 24, 1975 [CH] Switzerland .................. 15197/75

[51] Int. Cl.² .................................... G01N 21/30
[52] U.S. Cl. .............................. 250/559; 355/68; 356/203
[58] Field of Search ............... 250/559, 571; 356/202, 356/203; 355/68, 69

[56] References Cited

U.S. PATENT DOCUMENTS

| 3,202,042 | 8/1965 | Jamieson et al. ............ 356/203 |
| 4,001,594 | 1/1977 | Akimoto et al. ............. 250/559 |

*Primary Examiner*—John Kominski
*Attorney, Agent, or Firm*—Burns, Doane, Swecker & Mathis

[57] ABSTRACT

A device is provided for pretesting originals to be copied for their copyability. The device includes a photoelectric point by point scanner and a decision circuit for evaluating density scanning values from the scanner. The decision circuit compares the scanning values with the minimum scanning value and produces a clear signal when a predetermined number of scanning values exceeds the minimum value by at least a given first threshold value. If this criterion is not fulfilled a skip signal is produced. In a preferred embodiment the decision circuit produces the clear signal only if the average value of a predetermined number of highest scanning values exceeds the minimum value by at least the given first threshold value.

The pretesting device is especially suitable for use in automatic copying machines where, when interconnected in appropriate manner with the exposure control and the feed system for the originals, the clear signal and the skip signal can be used for clearing or suppressing, respectively the copying process.

8 Claims, 3 Drawing Figures

DEVICE FOR PRETESTING ORIGINALS TO BE COPIED FOR THEIR COPYABILITY

The invention provides a device for pretesting originals to be copied for their copyability, said device being provided with photoelectric means for measuring the original and a decision circuit connected to said photoelectric means which evaluates the resultant measured values in accordance with a given criterion and which produces a clear signal when this criterion is fulfilled and a skip signal when it is not.

When preparing photographic copies in automatic copying machines, it has proved necessary to reduce the spoilage rate by examining the originals, which are normally in the form of negatives, for their copyability before the actual copying process and not to copy at all originals which have been found to be unfit for copying. The more recent automatic copying machines are therefore normally provided with a pretesting device in, or by means of which, the originals to be copied are measured densitometrically and evaluated by specific criteria. The pretesting device is interconnected in an appropriate manner with the exposure control mechanism and the feed system for the originals, and, on detection of an original which is unfit for copying, causes this original to be transported through the exposure station of the copying machine without the copying process actually taking place. In this context, and throughout this specification, originals which are unfit for copying are to be understood as meaning solely negatives or the beginnings or ends of films which are over- or underexposed to an extreme degree. Examples of such copying machines and pretesting devices and particulars on the electrical interconnection of these latter with the feed system of the copying machine, are to be found, inter alia, in DT-OS Nos. 2,048,061 and 2,217,680, and are described in detail therein.

In the majority of known pretesting devices, in particular that disclosed in DT-OS No. 2,048,061, the originals are examined for their integral transparency, preferably in the red channel, and are only passed for copying if their integral transparency lies between two given threshold values. This method of evaluation is full of uncertainties. For example, the adjustment of the lower threshold value is extremely critical, since the difference in the integral transparency between an unexposed piece of film and an underexposed negative on which the motif occupies only a small area of space is extraordinarily small. A further problem arises from the fact that the density of the unexposed film is not always the same, but depends on the emulsion number, storage and development. Density fluctuations can therefore occur, which result in the exposure of negatives which are not really fit to be copied. It constantly happens that unexposed negatives are copied when the fog is somewhat denser than on average film. On the other hand, copyable negatives on a film with very low basic densities can be skipped. The adjustment of the threshold values must therefore be made individually for each type of film and is exceptionally tricky.

The same also applies to the pretesting device described in DT-OS No. 2,217,680, in which the original is divided into five separate areas and the integral transparency is determined separately for each area, and all five transparency values must lie between two given limits to detect whether the original is suitable for copying. Here too the correct adjustment of the limits is exceeding critical and requires frequent correction.

It is the task of the present invention to improve a pretesting device of the kind defined at the outset in such a manner that it no longer has the deficiencies referred to above of the known prior art and makes possible a reliable evaluation of the originals to be copied. According to the invention, the solution of this task is accomplished by the photoelectric means being a scanning means which operates point by point and produces scanning values in the points scanned corresponding to the density of the original, and the desicion circuit containing first means for detecting the minimum scanning value and second means connected to said first means for comparing the scanning values with the minimum scanning value and producing the clear signal if at least one scanning value is higher than the minimum scanning value by at least a first given threshold value.

The criterion for the copyability is thus not the absolute integral density of the film, but the difference between the lowest and the higher film densities measured on the negative. In this way, the readjustment of the density limits for different types of film automatically becomes redundant, since the minimum density of the underexposed negatives corresponds in general to the density of the unexposed film.

The invention is explained in more detail hereinafter with reference to the working examples illustrated in the drawings.

FIG. 1 shows a block diagram of an automatic printing machine and

Figure 2:
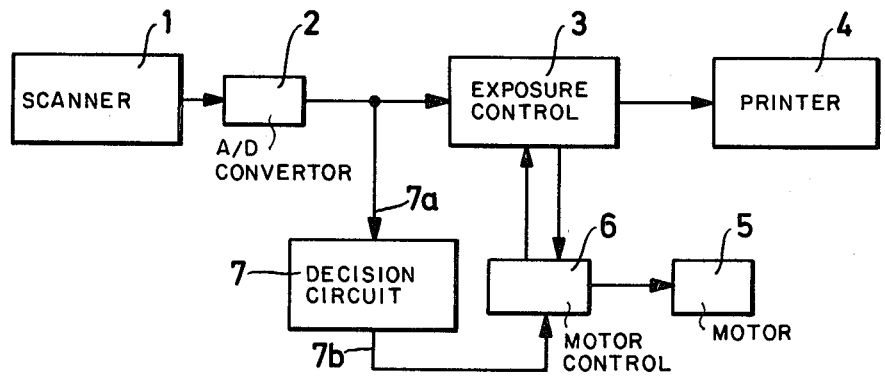
FIGS. 2-3 show a block diagram of two modifications of a decision circuit.

The copying machine illustrated in FIG. 1 comprises a photoelectric scanner 1 which scans the original to be copied point by point, an analog-to-digital converter (andicon) 2 which converts the scanned transmission data into density data, an exposure control 3 which calculates from the density data the exposure data for the respective original being tested, and a printer 4, which is controlled by the exposure control 3, in which the actual copying takes place. Also provided are a feed motor 5 for the originals, a control 6 for controlling this motor, and a decision circuit 7 for testing the originals for their copyability which processes the density data and acts on the motor control. With the exception of the decision circuit 7, all these operational components of the copying machine are of known construction, for example more or less on the lines of those disclosed in DT-OS No. 2,406,191 or in U.S. patent applications Ser. Nos. 722,155/1976 and 713,196/1976.

The originals to be copied, which are usually joined together to form a strip (developed negative film), are scanned by means of the scanner 1 in a scanner station which is spatially separated from the printer 4 and then further transported into the printer. In the intervening period, the decision circuit evaluates the scanning data according to specific criteria and releases a clear signal if these criteria are fulfilled. If the criteria are not fulfilled, the decision element releases a skip signal. The clear or, as the case may be, skip signal is then stored or delayed until the original in question has arrived in the printer. Where a clear signal is released, viz. when the original is adjudged suitable for copying, this original is then copied on the basis of the exposure data determined by the exposure control 3. A skip signal on the other hand causes the motor control 6 to set the feed motor for the originals in motion and simultaneously the exposure in the printer 4 to be suppressed, in other words not to be released, so that the original detected as not suitable for copying is not copied. In detail, this procedure is carried out as described for example in the DT-OS Nos. 2,048,061 and 2,217,680 previously referred to, or as it takes place in Model 3116 of the automatic printing machines made by GRETAG AG, Regensdorf, Switzerland, and commercially available since 1968.

Figure 3:
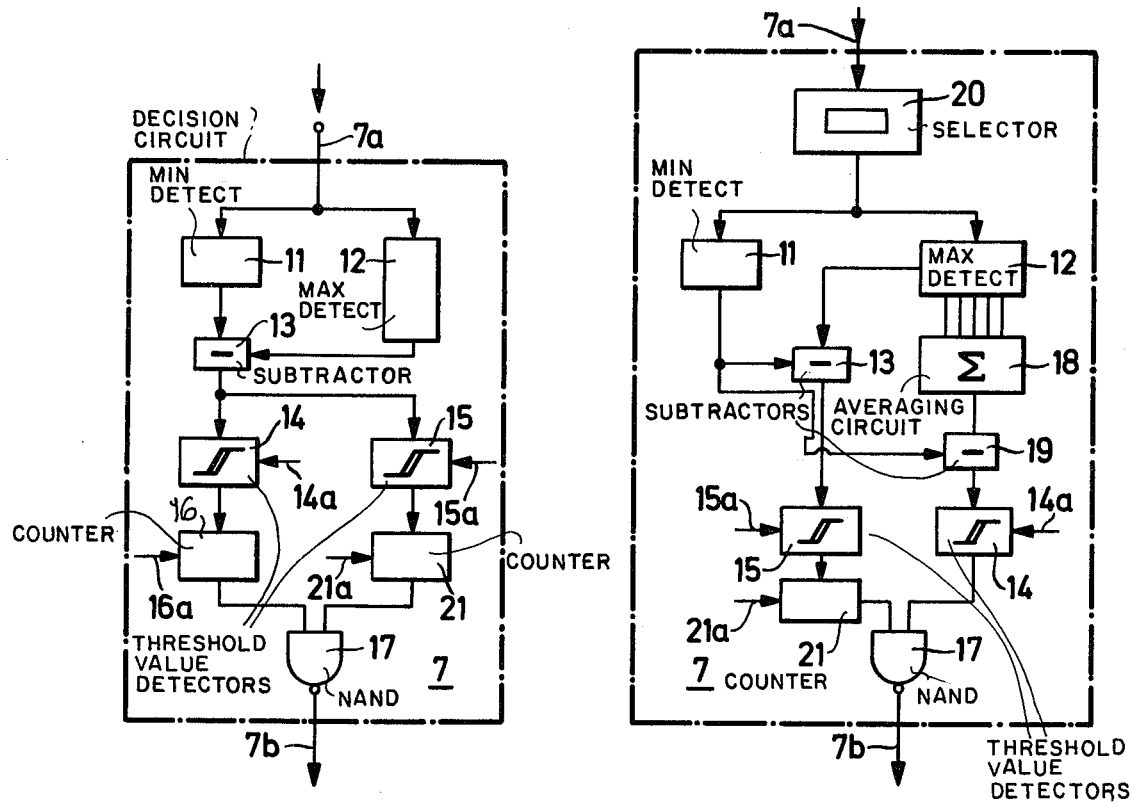

Two modifications of the decision circuit 7 are shown in more detail in FIGS. 2 and 3. The modification of FIG. 2 comprises a minimum detector 11, a maximum detector 12, a subtractor 13, a first threshold value detector 14 and a second threshold value detector 15, a counter 16, a NAND gate 17 and a further counter 21.

The scanning data originating from the A/D converter 2 arrive via the input 7a of the decision circuit on the one hand in the minimum detector 11, which selects therefrom the minimum scanning value and stores it for the subsequent evaluation, and on the other hand in the maximum detector 12, which selects therefrom the N highest scanning data and stores them for the subsequent evaluation, N being an integer from 1 or 2 to about 20, preferably from 3 to 10.

The differences between the N highest scanning data and the minimum scanning value are formed in the subtractor 13. These differential values are then conveyed to the two threshold detectors 14 and 15 and compared therein with a first and second threshold value respectively. Both threshold values are adjustable, as indicated by the arrows 14a and 15a. The first threshold detector 14 produces on each occasion an output signal when the difference between one of the N highest scanning data and the minimum scanning value exceeds the adjusted first threshold value. The second threshold value detector 15 always emits a counting pulse to the counter 21 whenever one of the differences in the scanning data exceeds the adjusted second threshold value. The counter 21 counts these pulses and emits an output signal for as long a preadjusted maximum number of pulses M is not exceeded. This maximum number is preferably 1 to 10 and is adjustable, as is indicated by the arrow 21a. The output signals of the first threshold detector 15 are counted by the counter 16. When a certain minimum number, which is adjustable (arrow 16a) and normally the same as N, is reached, the counter 16 also produces an output signal. The output signals of the two counters 16 and 21 are combined with each other in the NAND gate 17. When both the output signal of the counter 16 and the output signal of the counter 21 are at its inputs, the NAND gate produces a clear signal, otherwise it produces a skip signal. Both these signals are then receivable at the output 7b of the decision circuit.

As is evident from the foregoing description, the originals are evaluated not, as hitherto, by a measurement of the absolute transparency or density, but by a contrast measurement, wherein always the lowest density occurring in the original is chosen as point of reference. For an original to be adjudged copyable, as first condition a given number N of scanning points must have a density which is higher than the minimum density of the original by at least the first threshold value. The number N is of any magnitude and in general three to five points suffice. In special cases, the number can be limited to one single point, whereby the decision circuit is greatly simplified. Values of 0.10 to 0.35, in particular 0.15 to 0.20, have proved advantageously for the first threshold value, i.e., the minimum required difference in density compared with the minimum density. In this way, strongly underexposed negatives can be reliably detected.

As second condition for the copyability, not more than a predetermined number M of points on the original, preferably 1 to 5, may have a contrast greater than that given by the second threshold value compared with the minimum density value. Suitable values for the second threshold value are between about 1.80 and 2.20 or about 0.10 and 0.35 below the maximum extent of the density of negative films. In this way it is possible to recognise with certainty, and to eliminate, negatives at the start of 35 mm films which are partly or completely blackened by daylight or negatives with a splice. It will be readily understood that, on occasion, this testing can be dispensed with, so that the second threshold detector 15, the counter 21, and the NAND gate 17, can be omitted.

The requirement that a number of scanning points must have a specific minimum contrast compared with the scanning point with the minimum density value for evaluating the copyability of the originals, avoids originals with a random small patch of higher density being assessed as copyable. The same effect can also be attained by passing only those originals for copying in which the average of the N highest density values has a minimum contrast compared with the minimum density of the originals.

A modification of the decision circuit which operates in accordance with these evaluation criteria is illustrated in FIG. 3. The elements corresponding to the elements of the modification of FIG. 2 are provided with the same reference numbers. Compared with the modification of FIG. 2, only an averaging means 18, a further subtractor 19 and a selecting means 20, whose functions are explained hereinafter, are additionally provided. There is no counter 16. The averaging means 18 forms from the five highest density values selected by the maximum detector 12 the average value from which the minimum density value is subtracted in the subtractor 19. The difference is compared by the first threshold value detector with the first threshold value and, if this latter is exceeded, an output signal is produced, as in the modification of FIG. 2, and conveyed to one input of the NAND gate 17. The other operational steps and their interaction are the same as in the modification of FIG. 2. The selecting means 20 selects from the scanner those data produced by the scanner which originate from a central area of the original which comprises approx. 50 to 70% of the total surface area of the original. The influence of areas of higher density which are frequently encountered at the edge of originals which are in effect underexposed, is thereby eliminated.

Both evaluation criteria of FIGS. 2 and 3 can also be combined. What this then amounts to is that only those originals are regarded as copyable in which both a certain minimum number of original points and the average of the densities in these points must have a given minimum contrast compared with the minimum density of the originals. Moreover, the given minimum contrast for the average value can be chosen somewhat lower than for the individual density values.

The modifications of the decision circuit shown in the figures serve solely to explain the principle of the invention. In practice, all the operational steps illustrated in the figures by discreet hardware elements are realized advantageously by a suitably programmed process control computer or microprocessor.

The above described pretesting device is by its nature especially suitable for use in copying machines whose exposure control mechanism operates by point by point scanning of the originals, so that the scanner which is in any case already present in the copying machine can then also be used for the pretesting device. However, it will be appreciated that it is also possible to construct the pretesting device as an indepenent unit with its own scanner for originals to be copied. Furthermore, it would also be conceivable to process the information on the copyability of the originals obtained with the pretesting device in a manner other than by direct action on the exposure control mechanism or the feed for the originals. For example, the pretesting device could also control a marking device which provides each non-copyable original with an appropriate mark.

I claim:

1. A device for pretesting originals to be copied for their copyability, said device being provided with photoelectric means for measuring the original and a decision circuit connected to said photoelectric means which evaluates the resultant measured values in accordance with a given criterion and which produces a clear signal when this criterion is fulfilled and a skip signal when it is not, wherein the photoelectric means is a scanning means which operates point by point and produces scanning values in the points to be scanned corresponding to the density of the original, and wherein the decision circuit contains first means for detecting the minimum scanning value and second means connected to said first means which compares the scanning values with the minimum scanning value and produces the clear signal when at least one scanning value is higher than the minimum scanning value by at least a given first threshold value.

2. A device according to claim 1, wherein the second means produces the clear signal only if at least three scanning values are higher than the minimum scanning value by at least the first given threshold value.

3. A device according to claim 1, wherein the second means forms the average value from the N highest scanning values, N being an integer from 2 to 20, and produces the clear signal only if the average value is higher than the minimum scanning value by at least the first given threshold value.

4. A device according to claim 1, wherein the second means produces the clear signal only if not more than a given number of scanning data M exceed the minimum scanning value by a given second threshold value, M being an integer from 1 to 10.

5. A device according to claim 1, wherein the first threshold value in the second means is adjustable to values corresponding to differences in density from 0.10 to 0.35.

6. A device according to claim 1, wherein the first threshold value in the second means is adjustable to values corresponding to differences in density from 0.15 to 0.20.

7. A device according to claim 4, wherein the second threshold value in the second means is adjustable to values corresponding to differences in density from 1.8 to 2.2.

8. A device according to claim 1, wherein the second means only selects from the scanning values those which originate from scanning points in a central area amounting to approximately 50 to 70% of the total surface area.

* * * * *